(12) United States Patent
Young (10) Patent No.: US 10,274,087 B2
(45) Date of Patent: Apr. 30, 2019

(54) REVERSE PRESSURE CAPABLE MECHANICAL SEAL

(71) Applicant: Flowserve Management Company, Irving, TX (US)

(72) Inventor: Lionel A Young, Murrieta, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 14/865,803

(22) Filed: Sep. 25, 2015

(65) Prior Publication Data

US 2017/0089467 A1 Mar. 30, 2017

(51) Int. Cl.
*F16J 15/34* (2006.01)
*F01D 25/18* (2006.01)

(52) U.S. Cl.
CPC ........ *F16J 15/3412* (2013.01); *F01D 25/183* (2013.01); *F05D 2220/40* (2013.01); *F05D 2240/55* (2013.01)

(58) Field of Classification Search
CPC . F16J 15/3412; F01D 25/183; F05D 2220/40; F05D 2240/55
USPC ................................ 277/400, 399, 401, 345
See application file for complete search history.

(56) References Cited

U.S. PATENT DOCUMENTS

| | | | | |
|---|---|---|---|---|
| 3,109,658 A | * | 11/1963 | Barrett | F16J 15/40 277/400 |
| 3,744,805 A | * | 7/1973 | Heinrich | F16J 15/3412 277/400 |
| 5,222,743 A | * | 6/1993 | Goldswain | F16J 15/3412 277/400 |
| 6,325,380 B1 | * | 12/2001 | Feigl | F01D 25/168 277/352 |
| 6,726,213 B2 | * | 4/2004 | Wang | F16J 15/348 277/400 |
| 2005/0212217 A1 | * | 9/2005 | Tejima | F16J 15/3412 277/399 |
| 2008/0317596 A1 | * | 12/2008 | Frankenstein | F04D 29/057 415/230 |
| 2014/0203517 A1 | * | 7/2014 | Ferris | F16J 15/3412 277/400 |

(Continued)

OTHER PUBLICATIONS

Centripetal force—definition by The Free dictionary.*

*Primary Examiner* — Nathan Cumar
(74) *Attorney, Agent, or Firm* — Maine Cernota & Rardin (57) ABSTRACT

A mechanical seal designed for gas applications minimizes leakage even when the pressure differential changes direction, such as during rapid deceleration of a turbocharger. The seal faces include both inner (ID) and outer (OD) diameter recessed features configured to admit gas between the faces from the inner and outer face diameters respectively. In embodiments, the ID features hydro-dynamically provide a pressurized gas cushion between the seal faces under normal conditions, and the OD features provide a cushion when the pressure differential is reversed. According to the embodiment, the ID and OD features can be provided in only one seal face, or distributed among both seal faces. For example, one seal face can include the ID features and the other the OD features. The ratio of the area covered by the ID and OD features, divided by the total seal face area, can be at least 0.75 or greater.

20 Claims, 7 Drawing Sheets

(56) References Cited

U.S. PATENT DOCUMENTS

2015/0123350 A1\* 5/2015 Itadani ................. F16J 15/3424
277/400

\* cited by examiner

REVERSE PRESSURE CAPABLE MECHANICAL SEAL

FIELD OF THE INVENTION

The invention relates to mechanical seals, and more particularly, to mechanical seals designed for gas applications in which the pressure differential across the seal is variable in direction.

BACKGROUND OF THE INVENTION

End face mechanical seals, also referred to as mechanical face seals or simply as mechanical seals, are commonly used to isolate fluids in rotating equipment, such as pumps, mixers, blowers, and compressors. Typically, a pressure differential exists across the seal faces of a mechanical seal, which may vary in intensity during operation, but which typically remains constant in direction.

Mechanical seals generally require that a lubricant or other "cushioning substance" occupy the gap between the stationary and rotating seal face, so as to minimize frictional heating and premature wear. For many applications, the process fluid is a liquid that is used as the seal lubricant, whereby it is allowed to enter the seal and slowly leak past the seal faces. In other applications, for example when the process fluid is non-lubricating and/or toxic, a separate, pressurized lubrication system is provided that introduces a liquid lubricant into the seal, which then slowly leaks into the process, thereby preventing any escape of the process fluid into the surrounding environment.

In certain applications, the seal faces of a mechanical seal cannot be lubricated by a liquid. An example is a seal that separates a compressor from a bearing housing in a turbocharger of an internal combustion engine.

Turbochargers are used for both commercial and racing applications in a wide variety of vehicle engines, including gasoline and diesel engines. They pose some unique and challenging operating conditions for a seal. Temperatures in a turbocharger can rise up to 200° C., and shaft speeds can reach 120,000 rpm. In addition, the pressure within the compressor can range from vacuum up to more than 5 bar, which means that the pressure differential across the seal can change directions.

Accordingly, a seal for a turbocharger must be able to minimize the loss of compressed air from the compressor side of a seal into the bearing housing when the pressure in the compressor is high, for example during normal turbocharger operation and when the engine and turbocharger are rapidly accelerating. The seal must also be able to minimize leakage of oil from the bearing housing side of the seal into the compressor side during rapid engine deceleration, when vehicle braking occurs and a vacuum is created on the compressor side of the seal that tries to pull oil from the bearing housing side of the seal into the compressor.

Poor performance of the seal in a turbocharger therefore can cause both loss of compressed air and leakage of oil into the compressor, thereby reducing the performance of the turbocharger, and hence reducing the overall performance of the engine. Over the years, several approaches have been proposed for providing a seal between the bearing housing and compressor sections of a turbocharger. These have ranged from piston rings to labyrinth seals.

Figure 1:
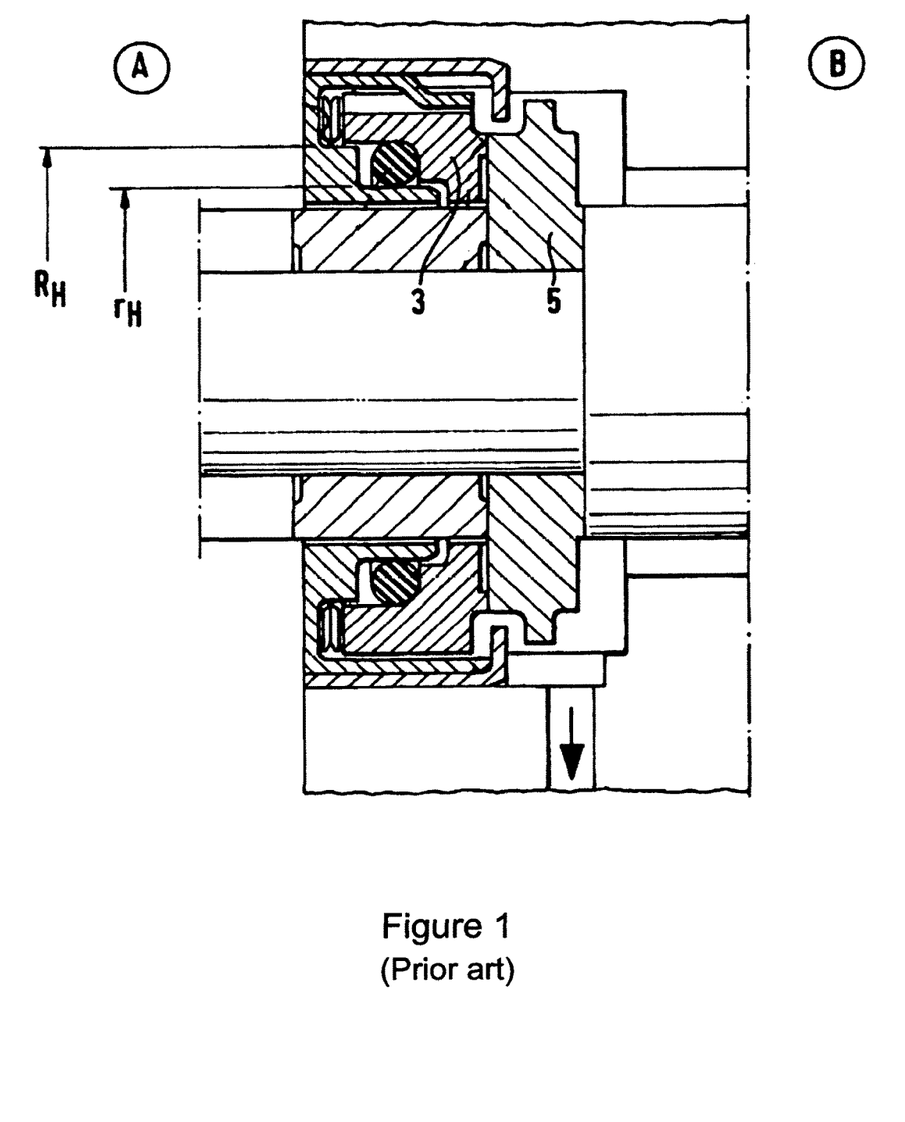
FIG. 1 is a cross sectional side view of a mechanical seal of the prior art designed for gas applications.

Mechanical seals designed for gas applications would be an attractive solution for turbochargers. While they tend to be somewhat complex, they offer distinct advantages in providing low air and/or oil leakage, as compared to the other types of seals that are normally used. One such mechanical seal design for a turbocharger is disclosed in U.S. Pat. No. 6,325,380 to Feigl, et al. Feigl discloses the use of a non-contacting mechanical gas seal that includes specific hydrodynamic features on at least one of the seal faces. In this design, illustrated in FIGS. 1 and 2, the air-filled compressor side is located at "A" and the bearing housing filled with oil is located at "B." The seal faces are items 3 (stationary face) and 5 (rotating face).

Figure 2:
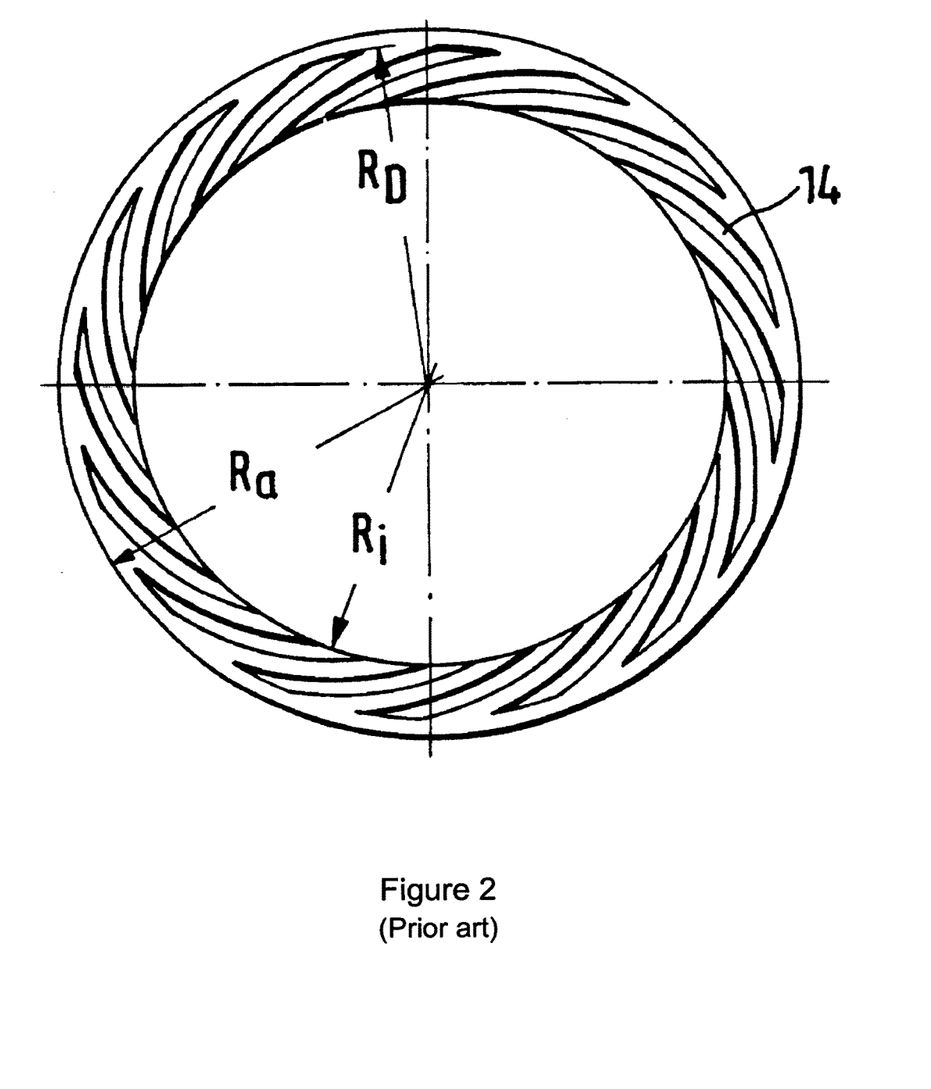
FIG. 2 is a front view of a seal face of the prior art seal of FIG. 1.

FIG. 2 illustrates the use by Feigl of micro machined hydrodynamic face features 14 located at the inner diameter of the stationary face 3. These features 14 can also be located on the rotating face 5 as well. Feigl's hydrodynamic seal face features 14 are micro machined grooves 14 in the seal face 3. Under rotating conditions, these grooves 14 pump and compress air into the gap between the faces 3, 5 and thereby generate lift between the faces 3, 5 for non-contact operation. The amount of lift (or face separation) can be controlled by careful design of the hydrodynamic features 14, based on the operating conditions of the turbocharger, especially its operational speed and the pressure. All else being equal, the separation between the faces 3, 5 will increase with increasing speed and pressure. Likewise, when the speed and pressure are decreased, the face separation will decrease as well.

One of the challenges with the Feigl approach, however, is that the hydrodynamic face features do not function when rapid car braking causes the turbocharger to reduce in speed, a vacuum is created within the compressor, and the pressure differential across the seal changes direction. Under these operating conditions, the face separation is dramatically reduced, because the hydrodynamic face features require air and compression to function appropriately. As a result, rapid deceleration can lead to unacceptable contact of the seal faces 3, 5 in the Feigl design, and can result in undue wear and seal face damage.

What is needed, therefore, is a mechanical seal designed for gas applications that can minimize leakage in both directions across the seal, so that undue leakage and wear of the seal faces is avoided even when the pressure differential across the seal changes direction, such as during rapid deceleration of a turbocharger.

SUMMARY OF THE INVENTION

A mechanical seal designed for gas applications is disclosed that minimizes leakage in both directions across the seal, so that undue leakage and wear of the seal faces is avoided even when the pressure differential across the seal changes direction, such as during rapid deceleration of a turbocharger.

The disclosed mechanical seal includes at least one sealing face in which are provided two sets of recessed face features, one set extending from the inner diameter of the face (the "ID" features) so as to admit gas into the gap between the seal faces from the inner diameter, and the other set extending from the outer diameter of the face (the "OD" features) so as to admit gas into the gap from the outer diameter.

In embodiments, the ID features function in a manner similar to the Feigl hydrodynamic features 14 shown in FIG. 2, in that they hydrodynamically maintain a cushion of compressed gas between the seal faces when the gas in the compressor is at a higher pressure than the gas in the bearing chamber. When the compressor side is under vacuum conditions, such that the ID features are functionally compromised, the OD features provide a cushion of compressed air between the seal faces by compressing air that is available from within the gearbox region, which is not under vacuum conditions. This ensures that the seal faces remain separated under all operating conditions, resulting in non-contact operation and significantly longer seal life of the seal. In embodiments, it is expected that the seal will last longer than the bearings.

In some embodiments, only one seal face includes the recessed features, while in other embodiments both of the seal faces include the recessed features. In still other embodiments, one of the seal faces includes the ID features, while the other seal face includes the OD features. In still other embodiments, the ID and OD features are distributed in other ways between the two seal faces.

In various embodiments where all of the ID and OD features are formed in the same seal face, the ratio of the seal face area that is covered by the ID and OD features, divided by the total seal face area, is at least 0.75 or greater. In some embodiments where the ID and OD features are distributed among the two seal faces, the ratio of the total area of both seal faces that is covered by the ID and OD features, divided by the total combined area of both seal faces, is at least 0.375 or greater.

Some embodiments of the present invention include a circumferential "seal dam" region on at least one of the seal faces into which the ID and OD features do not extend. In some of these embodiments, the seal dam region helps to further minimize leakage of air and other gases, as well as oil and other liquids, past the seal, especially under static conditions, for example if the bearing chamber of a turbocharger is overfilled or if the turbocharger is tipped at an unexpected angle during installation or other handling.

One general aspect of the present invention is a mechanical seal suitable for gas applications in which the pressure differential across the seal is variable in direction. The mechanical seal includes a substantially annular static seal face maintained in close, parallel relationship with a substantially annular rotatable seal face, the rotatable seal face being rotatable about a common axis of the seal faces, the seal faces being bounded by inner and outer face boundaries and separated from each other by a variable seal gap, a first plurality of recessed features formed in at least one of the seal faces, each of the first recessed features being configured to admit gas into the seal gap from only the inner boundary of the seal face in which it is formed, and a second plurality of recessed features formed in at least one of the seal faces, each of the second recessed features being configured to admit gas into the seal gap from only the outer boundary of the seal face in which it is formed.

In some embodiments, the first and second recessed features are formed in the static seal face, while in other embodiments the first and second recessed features are formed in the rotatable seal face, and in still other embodiments the first and second recessed features are distributed among both of the seal faces. In some of these embodiments all of the first recessed features are formed in one of the seal faces, and all of the second recessed features are formed in the other of the seal faces.

In any of the above embodiments, the second plurality of recessed features can be hydrodynamically shaped so as to pressurize gas admitted thereby into the seal gap. And in some of these embodiments the recessed features are able to pressurize gas within the seal gap to a pressure that is sufficient to cause face separation but is not sufficient to overcome centripetal effects, so that the recessed features are unable to cause seal leakage by driving fluids across the seal.

In any of the above embodiments wherein all of the first and second recessed features are formed in the same seal face, a ratio of a total area of the first and second recessed features divided by a total area of the seal face in which the recessed features are formed can be at least 0.75.

In any of the above embodiments wherein the first and second recessed features are distributed among the seal faces, a ratio of a total area of the first and second recessed features divided by a total area of both of the seal faces can be at least 0.375.

And in any of the above embodiments, at least one of the seal faces can include a circumferential seal dam region into which neither the first recessed features nor the second recessed features extend.

Another general aspect of the present invention is a turbocharger that includes a compressor actuated by a rotatable shaft, a lubricated bearing chamber configured to support the rotatable shaft, and a mechanical seal configured to isolate the lubricated bearing chamber from the compressor. The mechanical seal includes a substantially annular static seal face maintained in close, parallel relationship with a substantially annular rotatable seal face, the rotatable seal face being rotatably coupled to the rotatable shaft, the seal faces being coaxial about the rotatable shaft, bounded by inner and outer face boundaries, and separated from each other by a variable seal gap, a first plurality of recessed features formed in at least one of the seal faces, each of the first recessed features being configured to admit gas into the seal gap from only the inner boundary of the seal face in which it is formed, and a second plurality of recessed features formed in at least one of the seal faces, each of the second recessed features being configured to admit gas into the seal gap from only the outer boundary of the seal face in which it is formed.

In some embodiments, all of the first and second recessed features are formed in the static seal face. In other embodiments, all of the first and second recessed features are formed in the rotatable seal face. And in still other embodiments the first and second recessed features are distributed among both of the seal faces. In some of these embodiments, all of the first recessed features are formed in one of the seal faces, and all of the second recessed features are formed in the other of the seal faces.

In any of the above embodiments, at least one of the recessed features can be hydrodynamically shaped so as to pressurize gas admitted thereby into the seal gap. In some of these embodiments, the recessed features are able to pressurize gas within the seal gap to a pressure that is sufficient to cause face separation but is not sufficient to overcome centripetal effects, so that the recessed features are unable to cause seal leakage by driving fluids across the seal.

In any of the above embodiments in which all of the first and second recessed features are formed in the same seal face, a ratio of a total area of the first and second recessed features divided by a total area of the seal face in which the recessed features are formed can be at least 0.75.

In any of the above embodiments in which the first and second recessed features are distributed among the seal faces, a ratio of a total area of the first and second recessed features divided by a total area of both of the seal faces can be at least 0.375.

And in any of the above embodiments at least one of the seal faces can include a circumferential seal dam region into which neither the first recessed features nor the second recessed features extend.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a mechanical seal designed for gas applications that minimizes leakage in both directions across the seal, so that undue leakage and wear of the seal faces is avoided even when the pressure differential across the seal changes direction, such as during rapid deceleration of a turbocharger.

Figure 3:
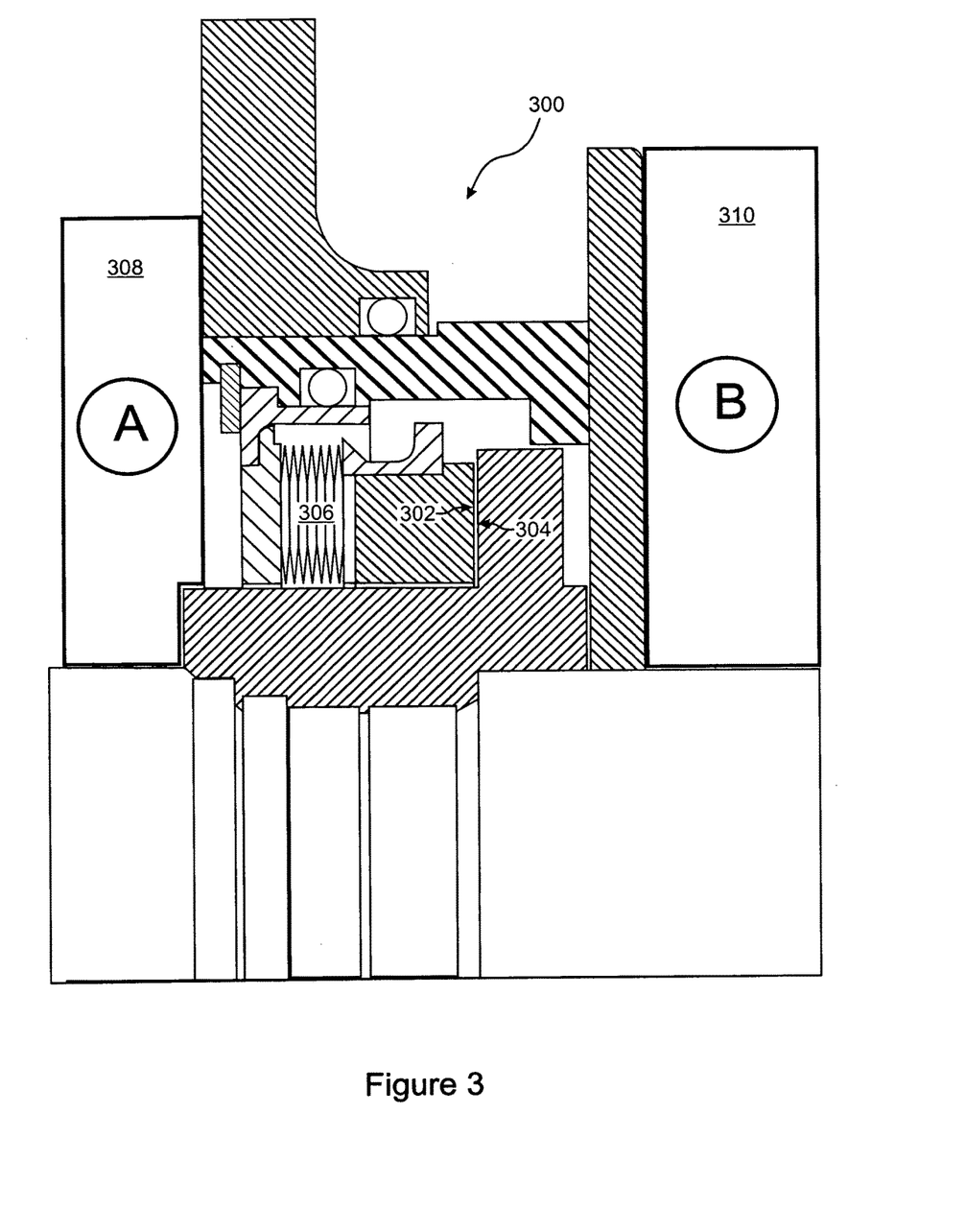
FIG. 3 is a side cross sectional view drawn to scale of a seal in an embodiment of the present invention.
Figure 4A:
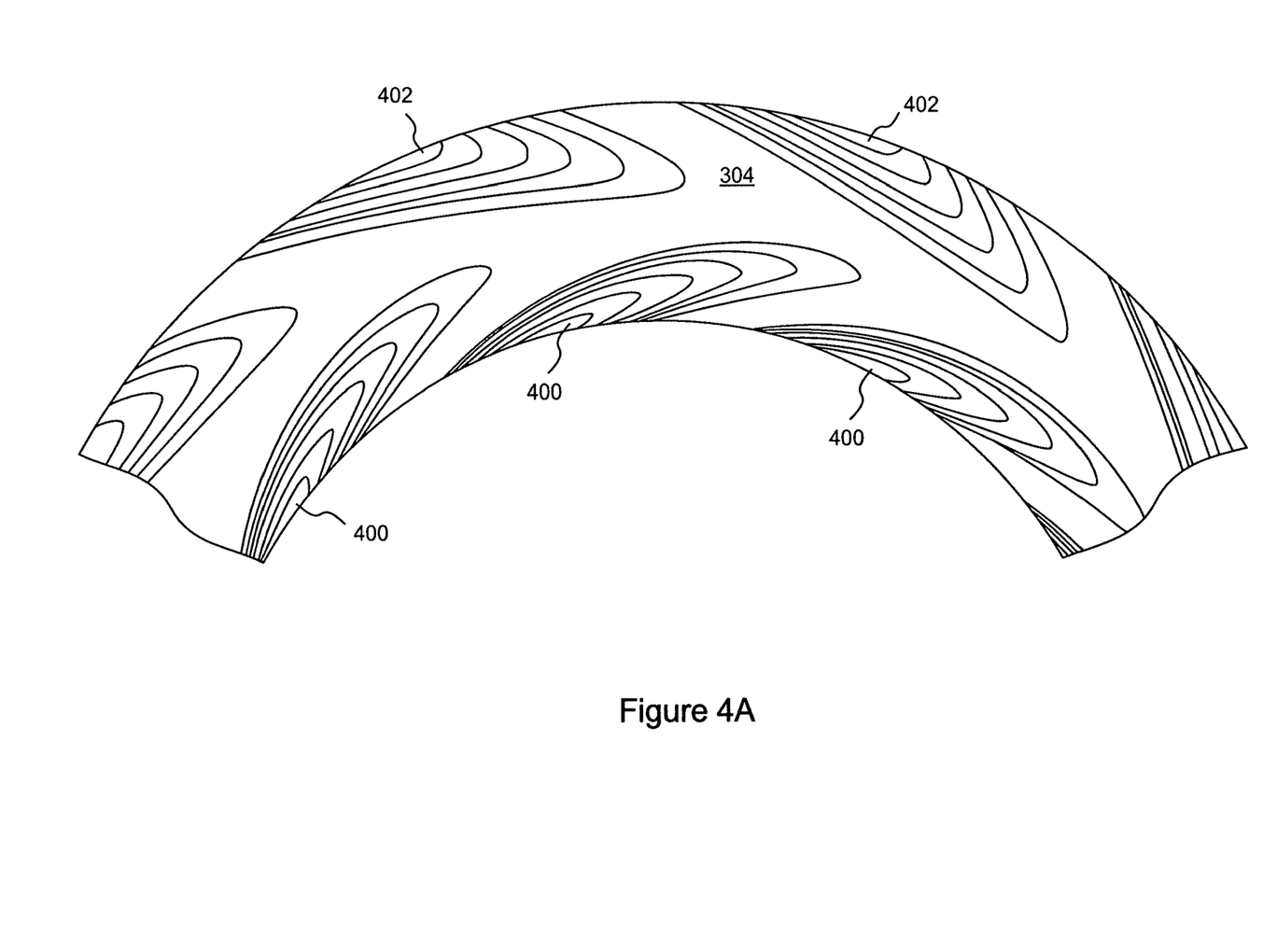
FIG. 4A is a front view drawn to scale of the rotating seal face of the seal of FIG. 3.

An embodiment 300 of the present invention applicable to a turbocharger is illustrated in FIGS. 3 and 4A. FIG. 3 is a side view of the seal 300 in this embodiment, in which regions A and B represent the compressor 308 and the lubricated bearing chamber 310, respectively. The static seal face is element 302, and the rotating seal face is element 304. In this embodiment, the actuation force is provided by a bellows 306, which enhances the high temperature tolerance of the seal 300. The recessed features 400, 402 in this embodiment are hydrodynamically shaped, and can be provided in either the rotating seal face 304 or static seal face 302. In the configuration shown in the Figures the recessed features are located on the rotating seal face 304.

FIG. 4A is a front view of a partial arc of the rotating seal face 304 of FIG. 3. The seal face includes one set 400 of hydrodynamic features extending outward from the inner diameter of the face (the "ID" features), and another set 402 of hydrodynamic features extending inward from the outer diameter of the face (the "OD" features). The ID features 400 function in a manner similar to the Feigl hydrodynamic features 14 shown in FIG. 2, by maintaining a cushion of compressed gas between the seal faces thereby producing non-contacting conditions during normal operation when the gas in the compressor is at a higher pressure than the air in the bearing chamber.

When the compressor side A is under vacuum conditions and the ID features 400 are not able to provide a sufficient gas cushion, the OD features 402 provide lift between the seal faces 302, 304 by compressing air that is available from within the gearbox region B, which is not under vacuum conditions. This ensures that the seal faces 302, 304 remain separated under all operating conditions, resulting in non-contact operation and significantly longer life of the seal 300. It is expected that the seal 300 will last longer than the bearings (not shown).

Figure 4B:
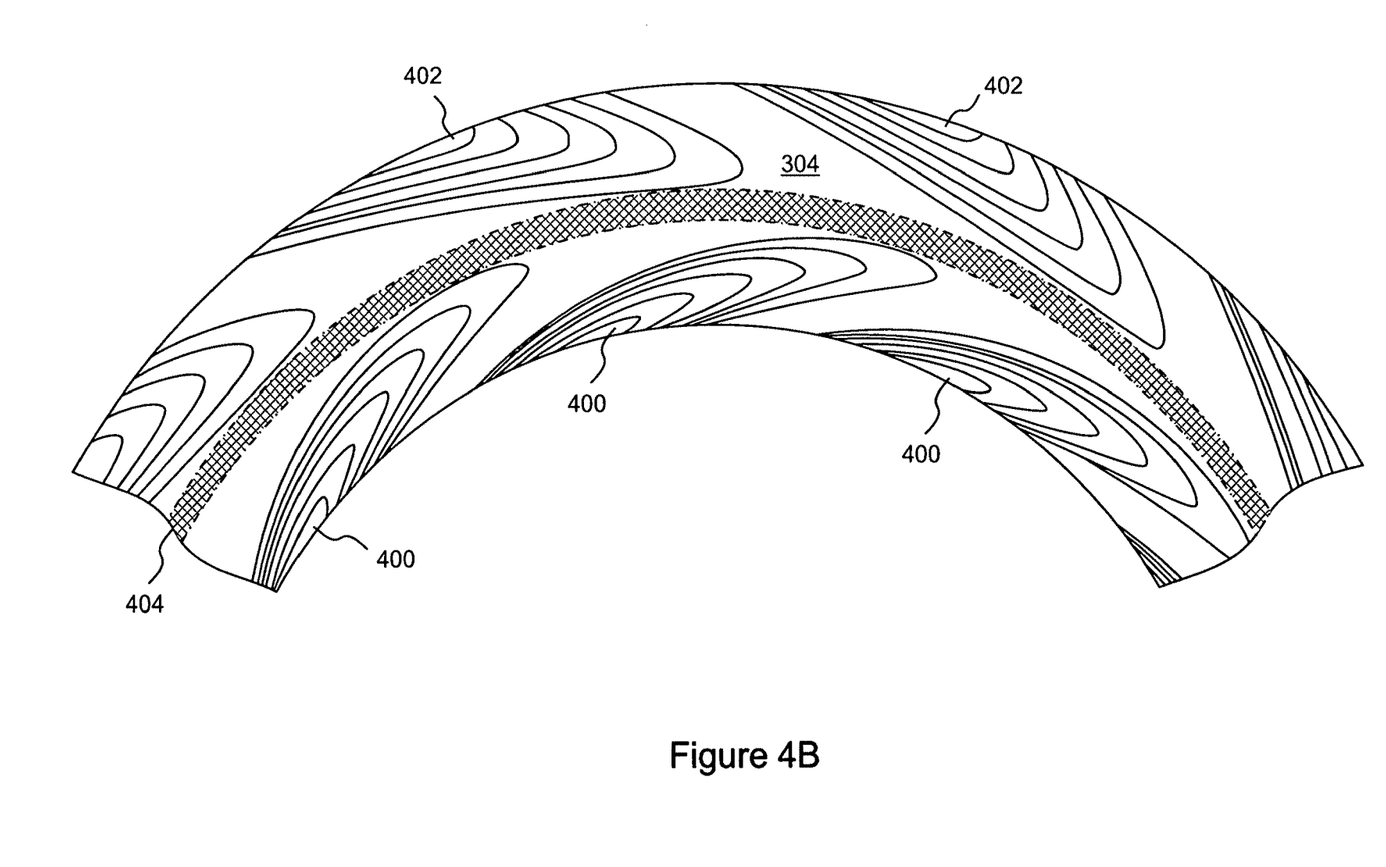
FIG. 4B is a front view drawn to scale of FIG. 4 A, which also indicates the location of a "seal dam" region of the seal face.

As shown in FIG. 4B, in embodiments of the present invention, such as the embodiment of FIG. 4A, the OD 402 and ID 400 features are arranged such that there is a circumferential "seal dam" region 404 provided between them on at least one seal face between the OD features 402 and the ID features 400. This seal dam region 404 is simply a circumferential region of the seal face into which neither the ID features 400 nor the OD features 402 extend. In embodiments, arranging the ID 400 and OD 402 features such that there is a seal dam region 404 between them helps to further minimize leakage of air and other gases, as well as oil and other liquids, past the seal, especially under static conditions, for example if the bearing chamber of a turbocharger is overfilled or if the turbocharger is tipped at an unexpected angle during installation or other handling.

Figure 4C:
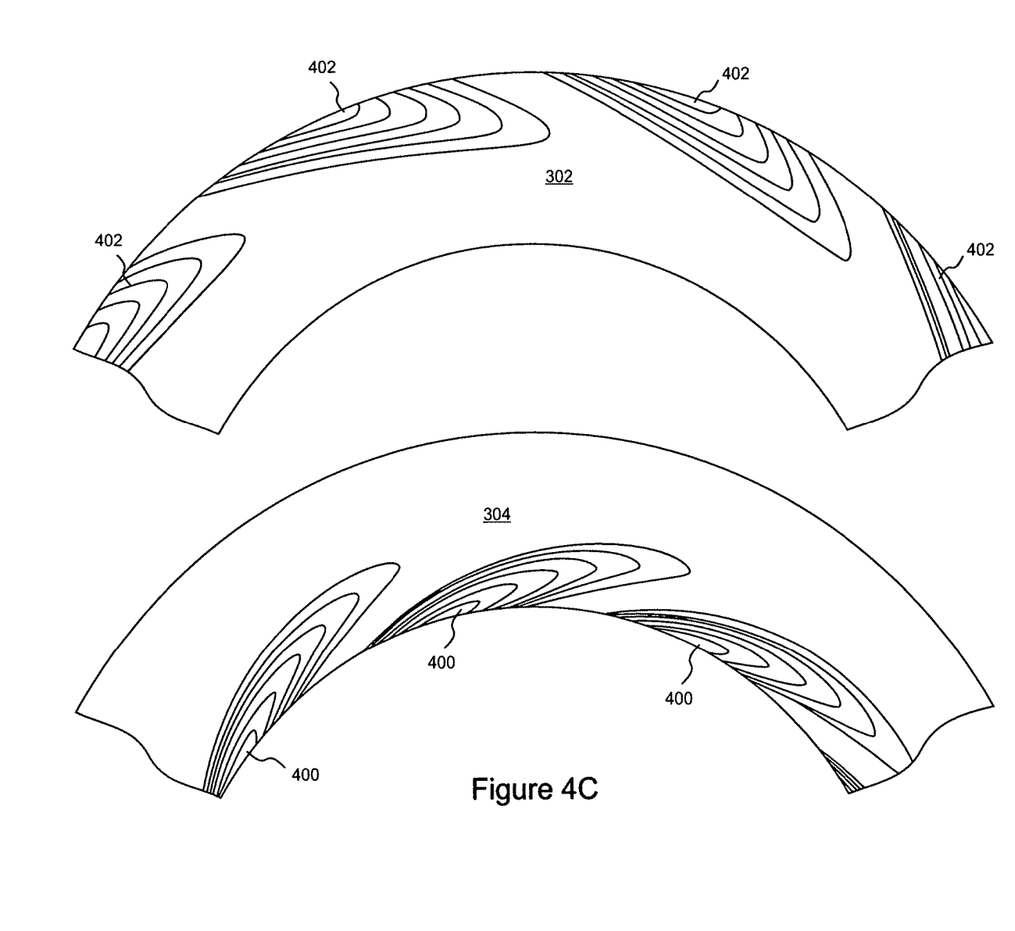
FIG. 4C is a front view drawn to scale of a rotating seal face positioned above a stationary seal face in an embodiment wherein all of the first recessed features are formed in the stationary seal face, and all of the second recessed features are formed in the rotating seal face.

It should be noted that, while all of the recessed features 400, 402 in the embodiment of FIGS. 3 and 4A are formed in the same seal face 304, the scope of the present invention extends to any distribution of the recessed features 400, 402, including distributions such as in the embodiment of FIG. 4C in which all of the ID features 400 are formed in one face and all of the OD features 402 are formed in the other face, as well as to embodiments in which the ID and OD features are distributed in any manner among the two seal faces.

It should also be noted that while the features 400, 402 in the embodiment of FIGS. 3 and 4A are described as being "hydrodynamic," because they are curved so as to provide a "pumping" action that actively pumps gas into the gap between the seal faces and pressurizes it, nevertheless the scope of the present invention extends to features of any shape, so long as each of the features is configured to admit gas into the gap from either the outer or the inner diameter of the seal faces, but not both.

Because the OD features 402 in the embodiment of FIGS. 3 and 4A are essentially hydrodynamic pumping features, it is important to ensure that oil on the bearing side B of the seal 300 is not pumped across the seal faces 302, 304 and into the compressor side A when the turbocharger is under vacuum conditions during deceleration. The hydrodynamic nature of the OD features 402 in this embodiment causes the developed pressure of the gas cushion within the gap between the seal faces 302, 304 to increase as the rotational speed of the rotatable seal face 304 increases. Accordingly, in embodiments the OD features 402 are configured such that they can generate a pressure sufficient to cause face separation, but cannot generate sufficient pressure to cause oil to migrate from the bearing side B of the seal to the compressor side A. This ensures that the centripetal effects which tend to eject oil from the seal 300 are stronger than the pressure differential and pumping effect of the OD features.

Figure 5:
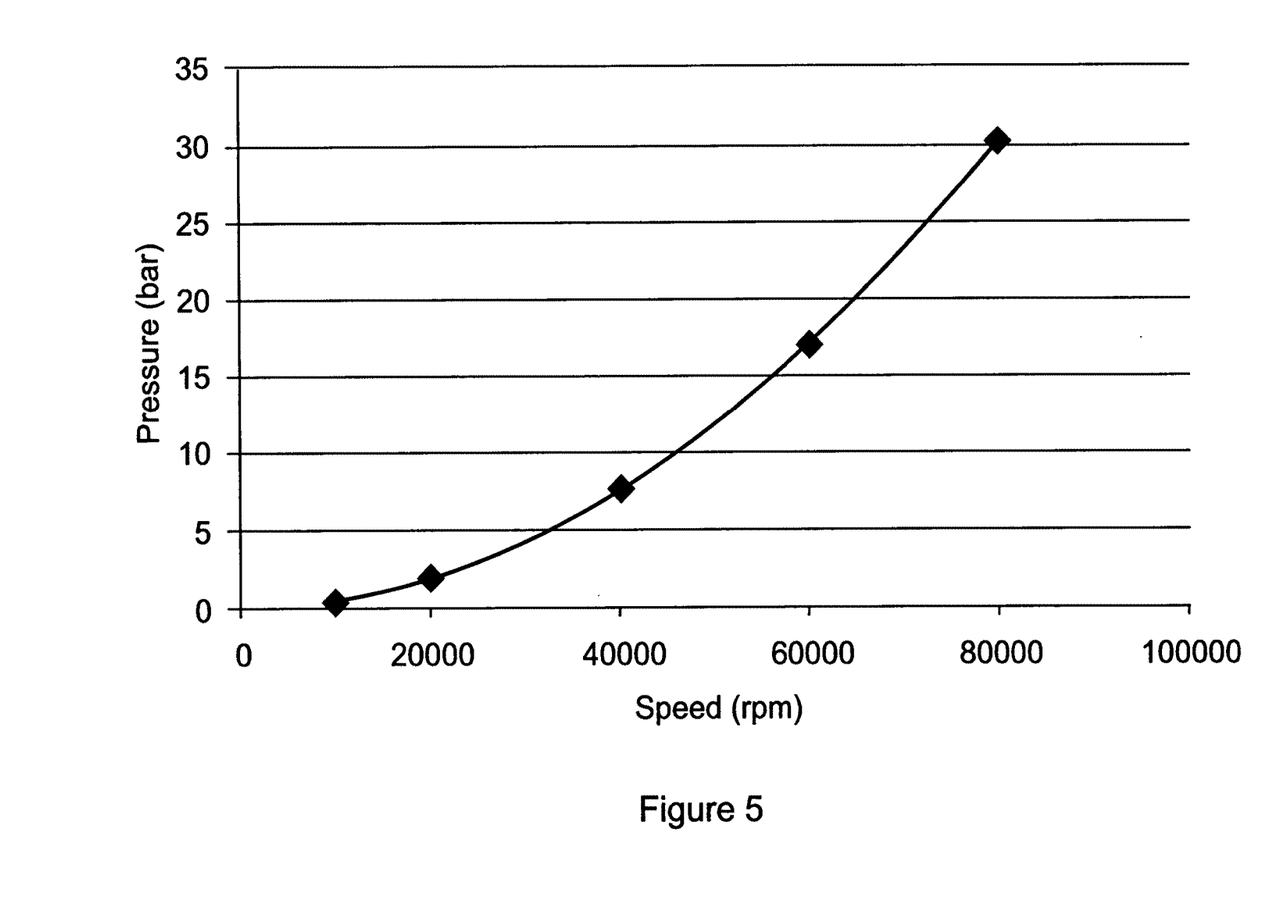
FIG. 5 is a graph presenting as a function of rotation speed the pressure on the outer diameter of the mechanical seal that is required to overcome the centripetal affects forcing oil from the interface in an embodiment of the invention.

Since the rotating seal face 304 acts as an oil "slinger," ejecting oil away from the seal faces 302, 304, the amount of differential pressure required to "push" the oil through the gap from the outer diameter to the inner diameter of the seal faces can be calculated as a function of rotation rate. The result of such a calculation for an embodiment of the present invention is shown in FIG. 5. It can be seen from the figure that the OD pumping features 402 would have to develop significant pressures to overcome centripetal effects and allow oil to escape into the compressor side A.

In various embodiments such as the embodiment of FIGS. 3 and 4, where all of the ID and OD features are formed in the same seal face, the ratio of the seal face area that is covered by the ID and OD features, divided by the total seal face area, is at least 0.75 or greater. In some other embodiments where the ID and OD features are distributed among the two seal faces, the ratio of the total area of both seal faces that is covered by the ID and OD features, divided by the total combined area of both seal faces, is at least 0.375 or greater.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A mechanical seal suitable for gas applications, said mechanical seal comprising: a substantially annular static seal face maintained in close, parallel relationship with a substantially annular rotatable seal face, the rotatable seal face being rotatable about a common axis of the seal faces, the seal faces being bounded by inner and outer face boundaries, axially impenetrable to fluids, and separated from each other by a variable seal gap; a first plurality of recessed features formed in at least one of the seal faces and extending to the inner face boundary, each of the first recessed features being configured to admit gas into the seal gap from only the inner boundary of the seal face in which it is formed, said first recessed features being configured to maintain a cushion of compressed gas between the seal faces when the gas at the inner boundary of the seal face is at a higher pressure than gas at the outer boundary of the seal face; and a second plurality of recessed features formed in at least one of the seal faces and extending to the outer face boundary, each of the second recessed features being configured to admit gas into the seal gap from only the outer boundary of the seal face in which it is formed, said second recessed features being configured to maintain a cushion of compressed gas between the seal faces when the gas at the outer boundary of the seal face is at a higher pressure than the gas at the inner boundary of the seal face all of said recessed features being rotationally biased so as to direct gas into the seal gap when the rotatable seal face is rotated in a first direction, while centrifugally expelling gas from the seal gap when the rotatable seal face is rotated in a second direction opposite to the first direction.

2. The mechanical seal of claim 1, wherein all of the first and second recessed features are formed in the static seal face.

3. The mechanical seal of claim 1, wherein all of the first and second recessed features are formed in the rotatable seal face.

4. The mechanical seal of claim 1, wherein the first and second recessed features are distributed among both of the seal faces.

5. The mechanical seal of claim 4, wherein all of the first recessed features are formed in one of the seal faces, and all of the second recessed features are formed in the other of the seal faces.

6. The mechanical seal of claim 1, wherein the second plurality of recessed features is hydrodynamically shaped so as to pressurize gas admitted thereby into the seal gap.

7. The mechanical seal of claim 6, wherein the recessed features are able to pressurize gas within the seal gap to a pressure that is sufficient to cause face separation but is not sufficient to overcome centripetal effects, so that the recessed features are unable to cause seal leakage by driving fluids across the seal.

8. The mechanical seal of claim 1, wherein all of the first and second recessed features are formed in the same seal face, and a ratio of a total area of the first and second recessed features divided by a total area of the seal face in which the recessed features are formed is at least 0.75.

9. The mechanical seal of claim 1, wherein the first and second recessed features are distributed among the seal faces, and a ratio of a total area of the first and second recessed features divided by a total area of both of the seal faces is at least 0.375.

10. The mechanical seal of claim 1, wherein at least one of the seal faces includes a circumferential seal dam region into which neither the first recessed features nor the second recessed features extend.

11. A turbocharger comprising: a compressor actuated by a rotatable shaft; a lubricated bearing chamber configured to support the rotatable shaft; and a mechanical seal configured to isolate the lubricated bearing chamber from the compressor, the mechanical seal including: a substantially annular static seal face maintained in close, parallel relationship with a substantially annular rotatable seal face, the rotatable seal face being rotatably coupled to the rotatable shaft, the seal faces being coaxial about the rotatable shaft, bounded by inner and outer face boundaries, axially impenetrable to fluids, and separated from each other by a variable seal gap; a first plurality of recessed features formed in at least one of the seal faces and extending to the inner face boundary, each of the first recessed features being configured to admit gas into the seal gap from only the inner boundary of the seal face in which it is formed, said first recessed features being configured to maintain a cushion of compressed gas between the seal faces when the gas at the inner boundary of the seal face is at a higher pressure than gas at the outer boundary of the seal face; and a second plurality of recessed features formed in at least one of the seal faces and extending to the outer face boundary, each of the second recessed features being configured to admit gas into the seal gap from only the outer boundary of the seal face in which it is formed, said second recessed features being configured to maintain a cushion of compressed gas between the seal faces when the gas at the outer boundary of the seal face is at a higher pressure than the gas at the inner boundary of the seal face; all of said recessed features being rotationally biased so as to direct gas into the seal gap when the rotatable seal face is rotated in a first direction, while centrifugally expelling gas from the seal gap when the rotatable seal face is rotated in a second direction opposite to the first direction.

12. The turbocharger of claim 11, wherein all of the first and second recessed features are formed in the static seal face.

13. The turbocharger of claim 11, wherein all of the first and second recessed features are formed in the rotatable seal face.

14. The turbocharger of claim 11, wherein the first and second recessed features are distributed among both of the seal faces.

15. The turbocharger of claim 14, wherein all of the first recessed features are formed in one of the seal faces, and all of the second recessed features are formed in the other of the seal faces.

16. The turbocharger of claim 11, wherein at least one of the recessed features is hydrodynamically shaped so as to pressurize gas admitted thereby into the seal gap.

17. The turbocharger of claim 16, wherein the recessed features are able to pressurize gas within the seal gap to a pressure that is sufficient to cause face separation but is not sufficient to overcome centripetal effects, so that the recessed features are unable to cause seal leakage by driving fluids across the seal.

18. The turbocharger of claim 11, wherein all of the first and second recessed features are formed in the same seal face, and a ratio of a total area of the first and second recessed features divided by a total area of the seal face in which the recessed features are formed is at least 0.75.

19. The turbocharger of claim 11, wherein the first and second recessed features are distributed among the seal faces, and a ratio of a total area of the first and second recessed features divided by a total area of both of the seal faces is at least 0.375.

20. The turbocharger of claim 11, wherein at least one of the seal faces includes a circumferential seal dam region into which neither the first recessed features nor the second recessed features extend.

* * * * *